United States Patent
Cowell et al.

(10) Patent No.: US 10,500,426 B2
(45) Date of Patent: Dec. 10, 2019

(54) THROWING HOOK

(71) Applicant: Treemagineers Ltd., Scotland (GB)

(72) Inventors: Christopher Sidney Cowell, Scotland (GB); Elliot James Tanner, North Wales (GB)

(73) Assignee: TREEMAGINEERS LTD., Pitlochry (GB)

( * ) Notice: Subject to any disclaimer, the term of this patent is extended or adjusted under 35 U.S.C. 154(b) by 123 days.

(21) Appl. No.: 15/142,080

(22) Filed: Apr. 29, 2016

(65) Prior Publication Data

US 2016/0317849 A1 Nov. 3, 2016

(30) Foreign Application Priority Data

May 1, 2015 (GB) .................................... 1507564.1
Apr. 27, 2016 (EP) .................................... 16167250

(51) Int. Cl.
*F16B 45/00* (2006.01)
*A62B 35/00* (2006.01)

(52) U.S. Cl.
CPC .......... *A62B 35/0068* (2013.01); *F16B 45/00* (2013.01)

(58) Field of Classification Search
CPC ..... A62B 35/0068; F16B 45/00; F16G 11/046
See application file for complete search history.

(56) References Cited

U.S. PATENT DOCUMENTS

| 633,927 | A | * | 9/1899 | Vincent | B66C 1/34 24/369 |
|---|---|---|---|---|---|
| 1,516,875 | A | * | 11/1924 | Allen | F16B 45/00 24/599.6 |
| 1,598,684 | A | * | 9/1926 | Jensen | F16B 45/04 24/600.8 |
| 1,953,860 | A | * | 4/1934 | Kraatz | F16G 11/046 24/115 R |
| 2,381,531 | A | * | 8/1945 | Ehmann | B66C 1/34 24/698.1 |
| 3,261,636 | A | * | 7/1966 | St Pierre | F16G 15/06 294/82.1 |
| 4,134,256 | A | * | 1/1979 | Fredriksson | F16G 15/06 59/93 |

(Continued)

FOREIGN PATENT DOCUMENTS

| BE | 663861 | 9/1965 |
|---|---|---|
| CN | 2259393 Y | 8/1997 |

(Continued)

OTHER PUBLICATIONS

GB Search Report, dated Oct. 19, 2015, from corresponding GB application.

(Continued)

*Primary Examiner* — Jason W San
(74) *Attorney, Agent, or Firm* — Young & Thompson

(57) ABSTRACT

A throwing hook including with particular, but not exclusive, use in arborism is disclosed. The hook includes a body that extends in a plane to form a bight profile and a shackle. The shackle includes a loop through which a line can be secured. The shackle is secured to the body such that the shackle and the body can pivot freely with respect to one another about an axis that lies within the plane. Embodiments may further include release elements operable by a user to facilitate release of the hook from an anchorage.

14 Claims, 14 Drawing Sheets

(56) References Cited

U.S. PATENT DOCUMENTS

| | | | | |
|---|---|---|---|---|
| 4,144,709 A * | 3/1979 | Dalferth | B66C 1/36 | |
| | | | 24/599.6 | |
| 4,432,121 A * | 2/1984 | Dupre | F16B 45/00 | |
| | | | 24/343 | |
| 4,785,509 A * | 11/1988 | Fisher | B63B 21/54 | |
| | | | 114/230.3 | |
| 4,868,954 A * | 9/1989 | Kasai | A45C 13/30 | |
| | | | 24/265 H | |
| 5,676,084 A * | 10/1997 | Palmer | B63B 21/54 | |
| | | | 114/230.2 | |
| 5,851,040 A * | 12/1998 | Fredriksson | B66C 1/125 | |
| | | | 294/82.11 | |
| D443,502 S * | 6/2001 | Yoshiguchi | D8/367 | |
| 6,317,940 B1 * | 11/2001 | Matoba | F16B 45/02 | |
| | | | 24/600.9 | |
| 7,992,263 B2 * | 8/2011 | Uehara | A45F 5/00 | |
| | | | 24/265 H | |
| 7,996,962 B2 * | 8/2011 | Peterson | F16B 45/02 | |
| | | | 24/129 R | |
| 8,381,374 B2 * | 2/2013 | Henry | A47K 3/38 | |
| | | | 160/330 | |
| 9,046,123 B2 * | 6/2015 | Rinklake | F16B 45/00 | |
| 9,199,105 B1 * | 12/2015 | Hung | A62B 35/0068 | |
| 9,429,182 B2 * | 8/2016 | Maurice | F16B 45/04 | |
| 9,453,527 B2 * | 9/2016 | Yoo | F16B 45/00 | |
| 9,474,336 B2 * | 10/2016 | Fathi | A44B 15/005 | |
| 2009/0265901 A1 * | 10/2009 | Berney | F16B 45/00 | |
| | | | 24/591.1 | |
| 2012/0210542 A1 * | 8/2012 | Yang | F16B 21/165 | |
| | | | 24/369 | |
| 2013/0322981 A1 * | 12/2013 | Root | B66C 1/125 | |
| | | | 410/97 | |
| 2014/0116803 A1 | 5/2014 | Overbaugh et al. | | |
| 2015/0322996 A1 * | 11/2015 | Mitchell | F16B 45/04 | |
| | | | 24/303 | |
| 2016/0102809 A1 * | 4/2016 | Kikuchi | F16B 45/00 | |
| | | | 248/206.5 | |
| 2016/0169267 A1 * | 6/2016 | Pool | F16B 45/00 | |
| | | | 248/547 | |
| 2016/0189578 A1 * | 6/2016 | Wicken | G09F 7/18 | |
| | | | 248/306 | |
| 2017/0073196 A1 * | 3/2017 | Choudhari | F16B 45/02 | |
| 2017/0241469 A1 * | 8/2017 | Pautsch | F16B 45/00 | |
| 2017/0241569 A1 * | 8/2017 | Bartos | F16B 45/00 | |
| 2017/0265665 A1 * | 9/2017 | Wright | F16B 2/10 | |

FOREIGN PATENT DOCUMENTS

| | | |
|---|---|---|
| FR | 2 344 760 A1 | 10/1977 |
| GB | 1110432 | 4/1968 |
| SU | 499862 A1 | 1/1976 |

OTHER PUBLICATIONS

European Search Report, dated Sep. 9, 2016, from corresponding European Application No. EP 16167250.

\* cited by examiner

THROWING HOOK

BACKGROUND TO THE INVENTION

Field of the Invention

This invention relates to a throwing hook.

Arborists work at height to dismember and cut down sections of trees by moving around the tree canopy whilst using cutting implements such as chainsaws and hand saws. While primarily being supported by a main line, arborists may use a secondary anchor line to enhance their ability to move around the canopy, or between canopies. One way to deploy such a secondary anchor line is by connecting it to a throwing hook, and then throwing the hook, pulling the line behind it, in an attempt to secure the throwing hook to an anchor such as a branch, stump or other part of a tree. This secondary anchor line is not intended to support the arborist's weight—it is not protective equipment. Therefore, it is not uncommon for the secondary rope to be deployed in an ad-hoc basis, for example by looping a rope over a branch of a tree.

Summary of the Prior Art

Various throwing hooks have been produced that can be used as described above. However, it is a matter of luck as to whether these will land on a branch with the correct orientation to hook onto it. It may take several attempts to achieve secure location of the hook.

SUMMARY OF THE INVENTION

An aim of this invention is to provide a hook that is more likely to achieve a secure connection with a branch than is the case with known hooks, so increasing the likelihood that a first throw will be successful.

To this end, the present invention provides a throwing hook comprising a body that extends in a plane to form a bight and a shackle, which shackle comprises a loop through which a line can be secured, in which the shackle is secured to the body such that the shackle and the body can pivot freely with respect to one another about an axis that lies within the plane.

It has been found that the provision of such a freely-pivoting shackle has the effect of allowing the hook to drop into place such that the bight can loop around a branch or similar anchoring point and thereby secure a line attached to the shackle.

The bight typically includes a curved portion that extends between a free end portion and an attachment region. The curved portion may turn through approximately 180°. In a preferred arrangement, the free end region and the attachment region extend substantially parallel to one another, the attachment region extending beyond the free end region. That is, there is a part of the body adjacent the attachment region that is beyond the free end region. That part of the body may have an outer surface that is straight in profile to constitute a fulcrum surface.

The throwing hook may further include a weight secured to or within a free end region or may have a weighted portion integral with the free end region. For example, the weight may be a bolt in threaded engagement with a tapped bore in the free end region. Alternatively or additionally, a functional component may be secured to the free end region. For example, the functional component may include a point that can engage with a surface to secure the hook on a surface.

The body preferably has a generally flat inner surface. This serves to minimise the contact pressure between the hook and a branch so minimising the risk of damage to a branch. The body typically has an external rib. This serves to strengthen the body, and also provides a narrow outer surface for the body upon which the body is unlikely to be supported. That is, if the body lands on the rib, the likelihood is that it will fall to one side to aid hooking. An aperture may be formed through the rib approximately centrally of the bight. This can provide a location to which an item such as a lanyard can be secured to carry the hook when it is not being used.

Although embodiments of the invention have been described with reference to use by an arborist, embodiments of the invention may find other applications where access to high places is required.

A hook embodying the invention is configured such that it is likely to hook onto an anchorage, such as a branch when thrown by a user. While this is a very useful property, it can mean, in some circumstances, that the hook is difficult to retrieve after use. Therefore, embodiments of the invention may be provided with means to aid release from an anchorage and subsequent retrieval.

Therefore, from a second aspect, this invention provides a throwing hook, optionally embodying the first aspect of the invention, that includes release means to allow a user to alter the disposition of the hook whereby it becomes less prone to engagement with an anchor.

Where a hook embodying the invention includes a bight that has a concave inner and convex outer surface, and a line connected to the hook, for example by a shackle, operation of the release means typically causes the hook to turn such that the convex outer surface faces more generally towards the line than when the hook is on an anchorage. The effect of this is to provide a leading surface which is convex, and therefore unlikely to get caught, when the hook is pulled by the line.

Embodiments of the invention will now be described in detail, by way of example, and with reference to the accompanying drawings.

DETAILED DESCRIPTION OF THE PRIOR ART

Figure 1:
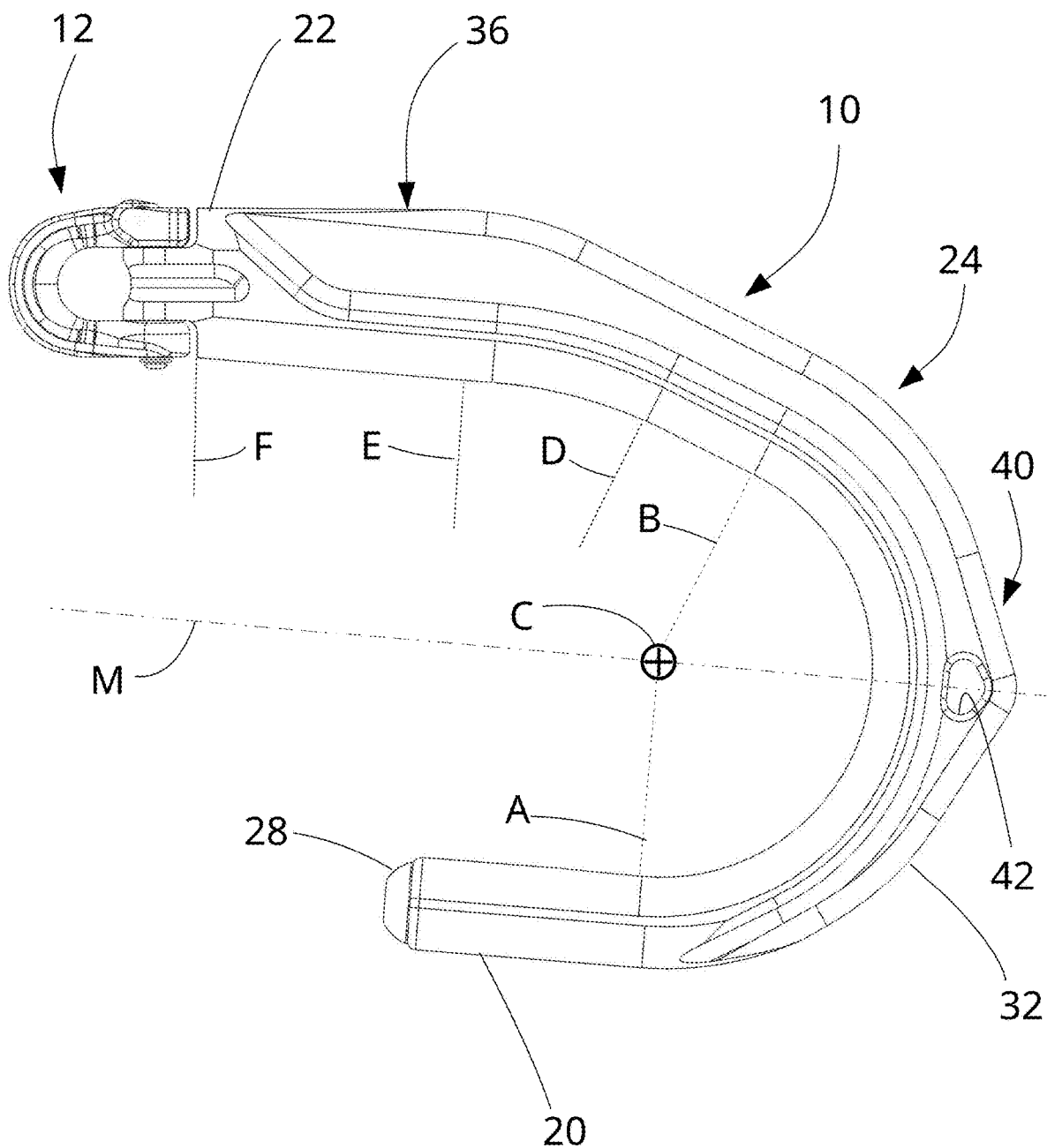
FIGS. 1 to 3 are side, perspective and top views of a throwing hook being a first embodiment of the invention.
Figure 2:
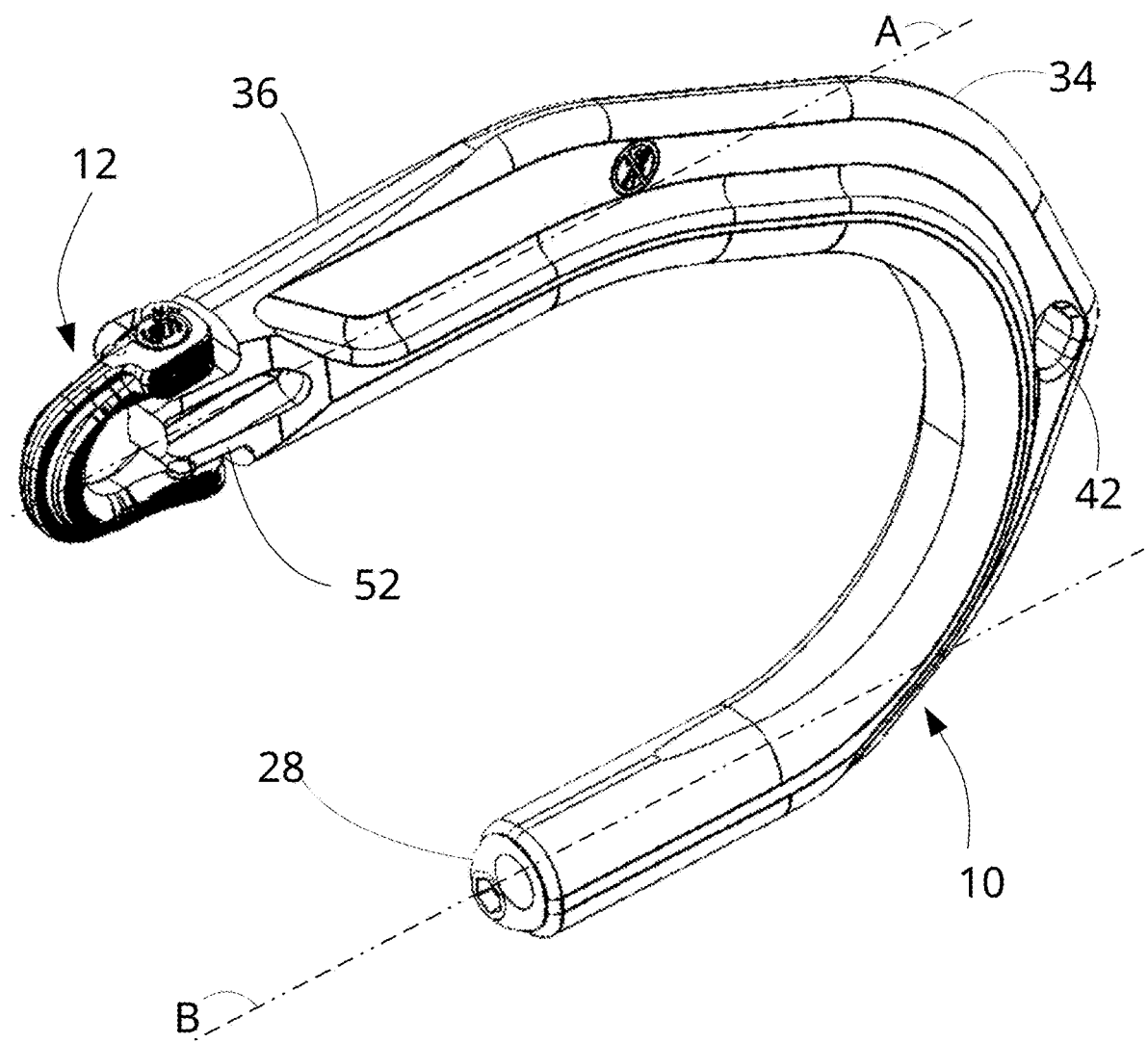
Figure 3:
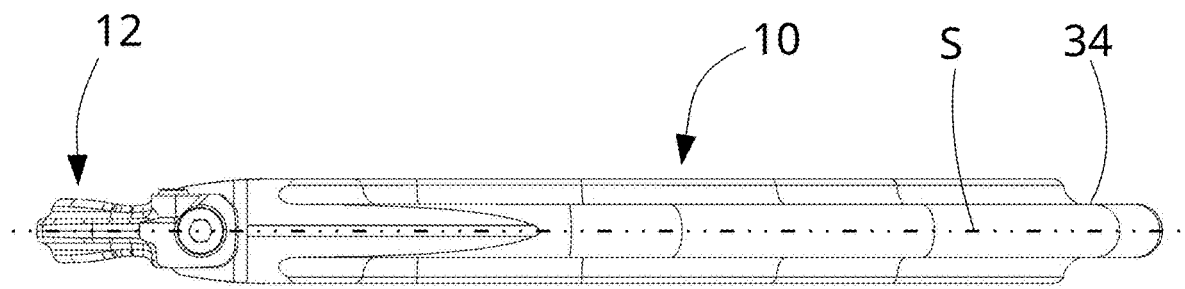
Figure 4:
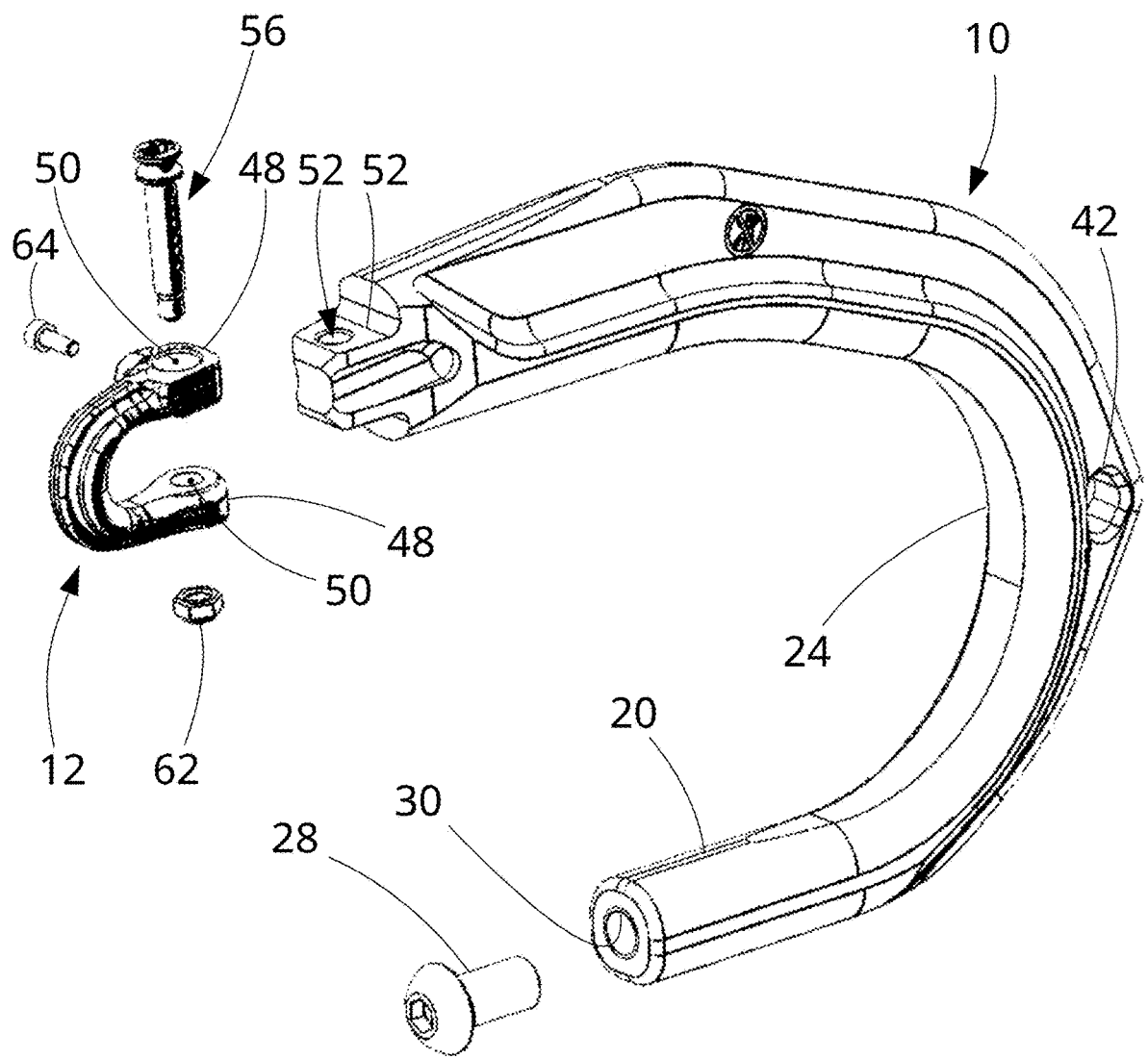
FIG. 4 is an exploded view of the hook of FIGS. 1 to 3.

With reference to FIGS. 1 to 4, a throwing hook intended for use by an arborist that embodies the invention comprises a body 10 and a shackle 12. The body is symmetrical about a centre plane S, which is coincident with the plane of FIG. 1. This symmetry will be assumed in all of the following description. The term "profile" will be used to refer to the shape of the body within the centre plane S, and the term "section" will be used to refer to the shape of the body normal to the centre plane S. Where dimensions are given, these are approximate, and refer to this embodiment only: embodiments for other applications may have very different dimensions.

The body 10 has a curved profile that will be described in detail in due course, and extends between a free end region 20 and an attachment end region 22 interconnected by an intermediate region 24. The overall shape of the body 10 is that of a hook, with the intermediate region 24 forming a roughly semi-circular bight that extends between the free end region and the attachment region 22, whereby the free end region 20 and the attachment region 22 have axes A, B that are approximately parallel to one another. The relative shapes and sizes of these components will be described in more detail below.

The free end region 20 has a cross-section shaped as a square having rounded corners and a straight profile of 50 mm in length. A bore 30 of circular section is formed axially in the free end region 20, the bore 30 opening at an end surface of the body 10. The bore 30 is tapped with an internal screw thread. The throwing hook further includes a bolt 28 that has a threaded shaft in engagement with the thread of the bore 30 and a head that abuts the end surface of the body 10. In this embodiment, the bolt 28 has a round dome head with a hex socket drive so that it presents no projections or sharp edges. The bolt 28 can be exchanged for another, or washers can be placed under the head, to vary the weight in accordance with the preference of a user.

The intermediate region 24 has a curved, U-shaped profile whereby the free end region 20 and the attachment end region extend almost parallel to one another. Extending from the free end region 20, part (CA-CB) of the intermediate region 24 extends in a circular arc of an extent of 135° and an inner radius 50 mm with respect to a centre C. The intermediate part then has a short section (B-D) that has a straight profile, followed by a section of curved profile (D-E) and a subsequent section of straight profile (E-F) that leads to the attachment end region 22. A median line M extends through the centre C generally parallel to the free end region 20. A hypothetical line extended from the end surface of the body 10 intersects with the intermediate region 24 at E.

Figure 7:
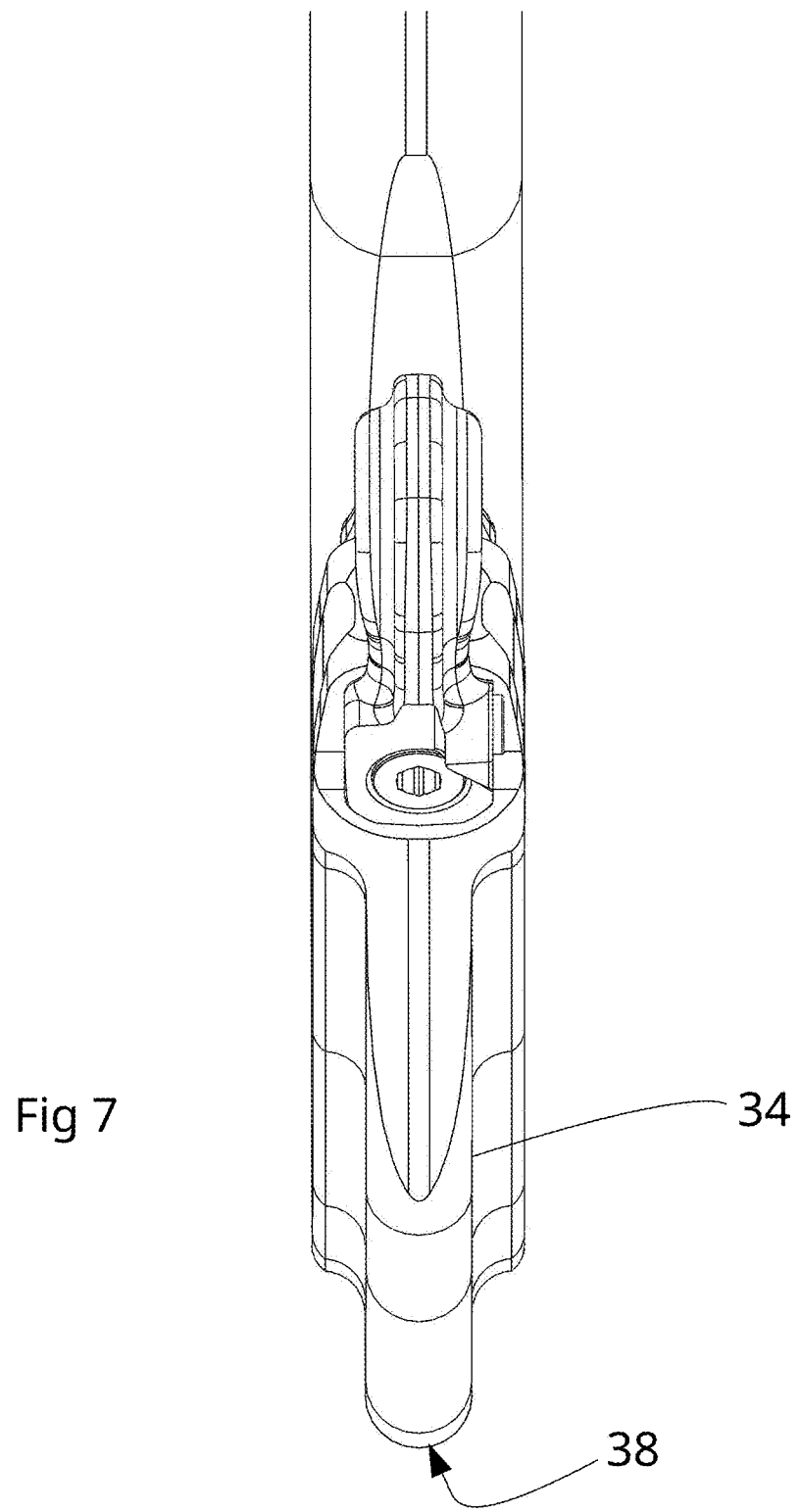
FIG. 7 is a bottom view of a body of the hook of FIGS. 1 to 4.

In profile, the intermediate region 24 has a radially inner section that presents a surface generally flat transversely and concave facing into the bight, that faces towards the centre C. Extending radially from the inner section there is a rib 34 that extends away from the centre C. The rib has an attachment region of relatively greater height 40 that is centred on the median line M. An aperture 42 extends through the attachment region 40 and is centred on the median line M. The rib 32 continues to the end of the straight profile of the intermediate region at E, whereafter it decreases in height towards the attachment region 22, the outer surface of the rib there serving as a fulcrum surface 36 of straight profile. The fulcrum surface 36 is approximately 5° off parallel with the median line M, convergent in a direction towards the attachment end region 22. As can be seen from FIG. 7, the rib 34 presents a convex outer surface 38 of comparatively small cross-section.

The shackle 12 comprises a length of forged alloy formed as a D-shape. End regions 48 of the shackle 12 have mutually facing flat surfaces. A respective aperture 50 extends through each end region, the apertures 50 being coaxial, their axes lying within the centre plane S and being normal to the fulcrum surface 36. An outer part of each aperture 50 is counterbored, and the counterbore of one aperture 50 is intersected by a transverse bore that extends through the end region. The attachment end region 22 includes a boss 52 through which a bore 52 is formed, the bore extending within the centre plane S. The boss 52 has flat side surfaces that are normal to the centre plane S, ends of the bore 54 being open to respective side surfaces. The side surfaces of the boss 52 are spaced apart by a distance that is slightly less than the spacing between the flat surfaces of the shackle 12.

Figure 8A:
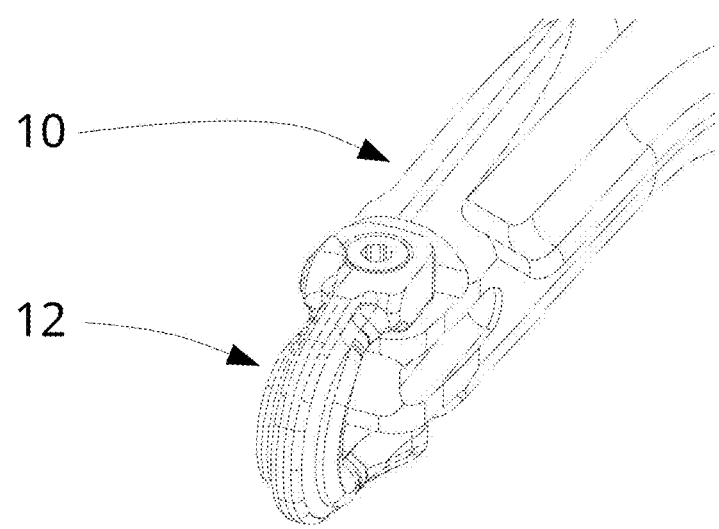
FIGS. 8a to 8c show possible positions of a shackle with respect to a body of the hook of FIGS. 1 to 4.
Figure 8B:
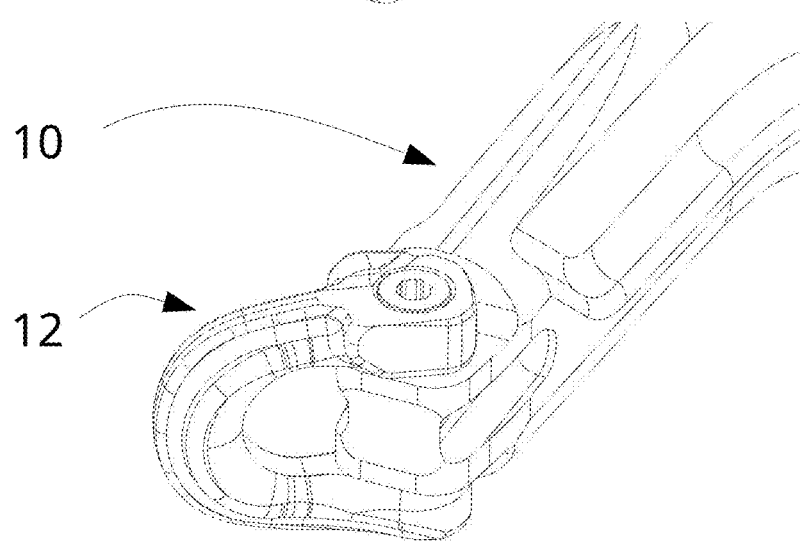
Figure 8C:
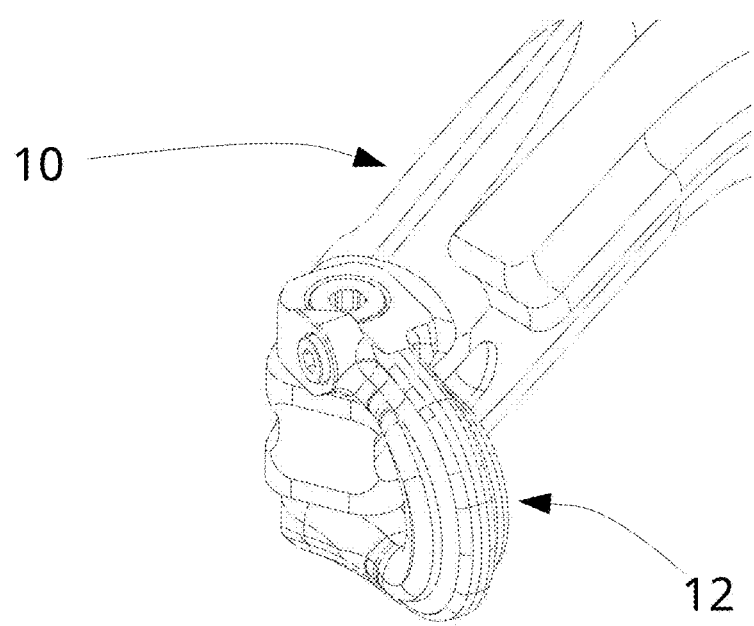

The shackle 12 is mounted on the boss such that the apertures 50 in its end regions are aligned with the bore 54 in the boss 52. A pin 56 extends through the apertures 50 and the bore 54, there being clearance between the bore 54 and the pin 56 whereby the shackle can pivot freely about the axis of the pin 56, as shown in FIGS. 8a to 8c. A nut 62 is applied to the pin 56, the nut 62 being received within one counterbore. The pin 56 has a head which is received within the counterbore of the aperture 50, a peripheral groove being formed in the head. A locking bolt 64 is passed through the transverse bore, whereby a shaft portion of the locking bolt passes within the peripheral groove to prevent removal of the pin 56 from the boss 52.

Figure 5:
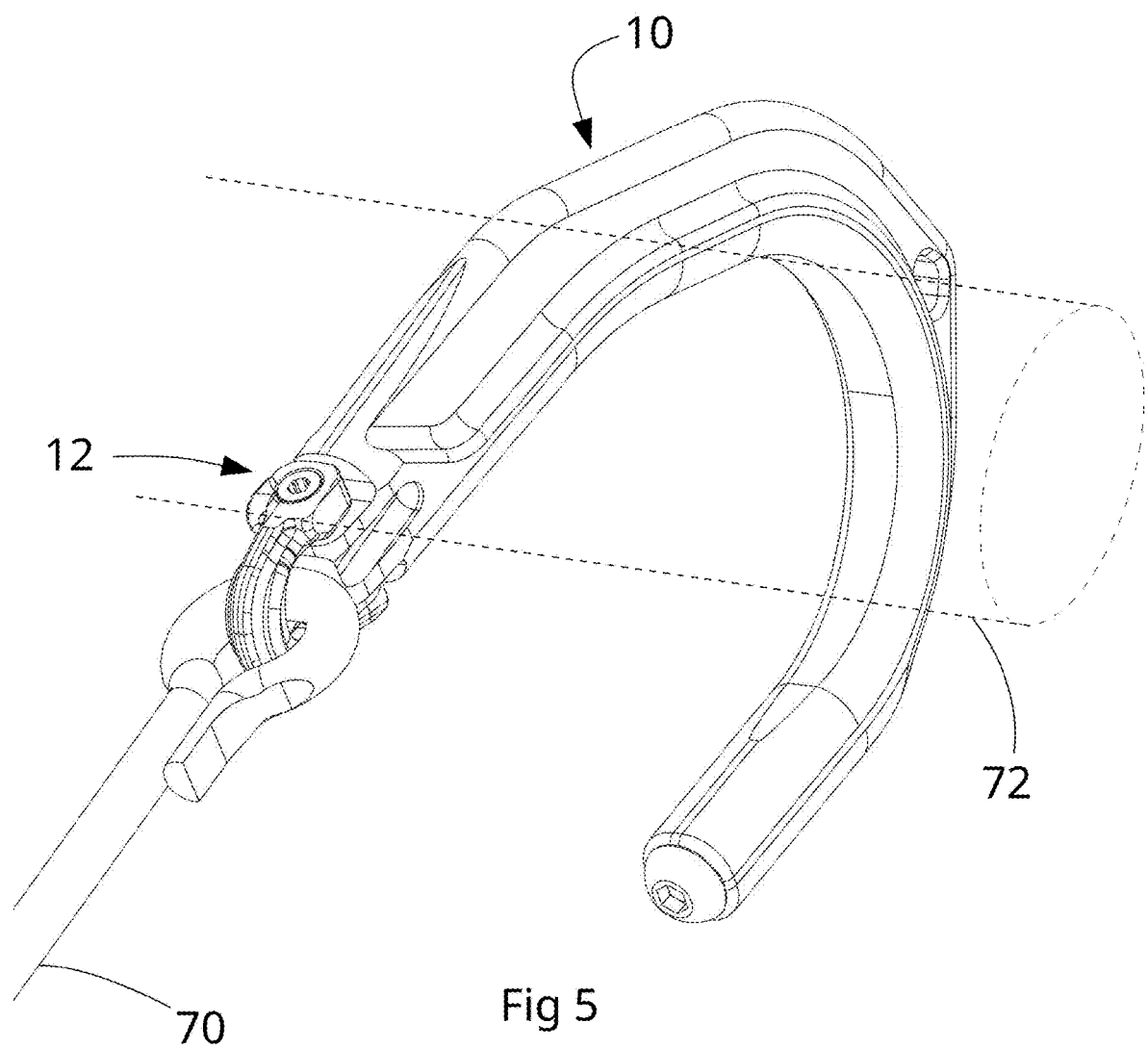
FIGS. 5 and 6 shows the hook of FIGS. 1 to 4 attached to a secondary line.
Figure 6:
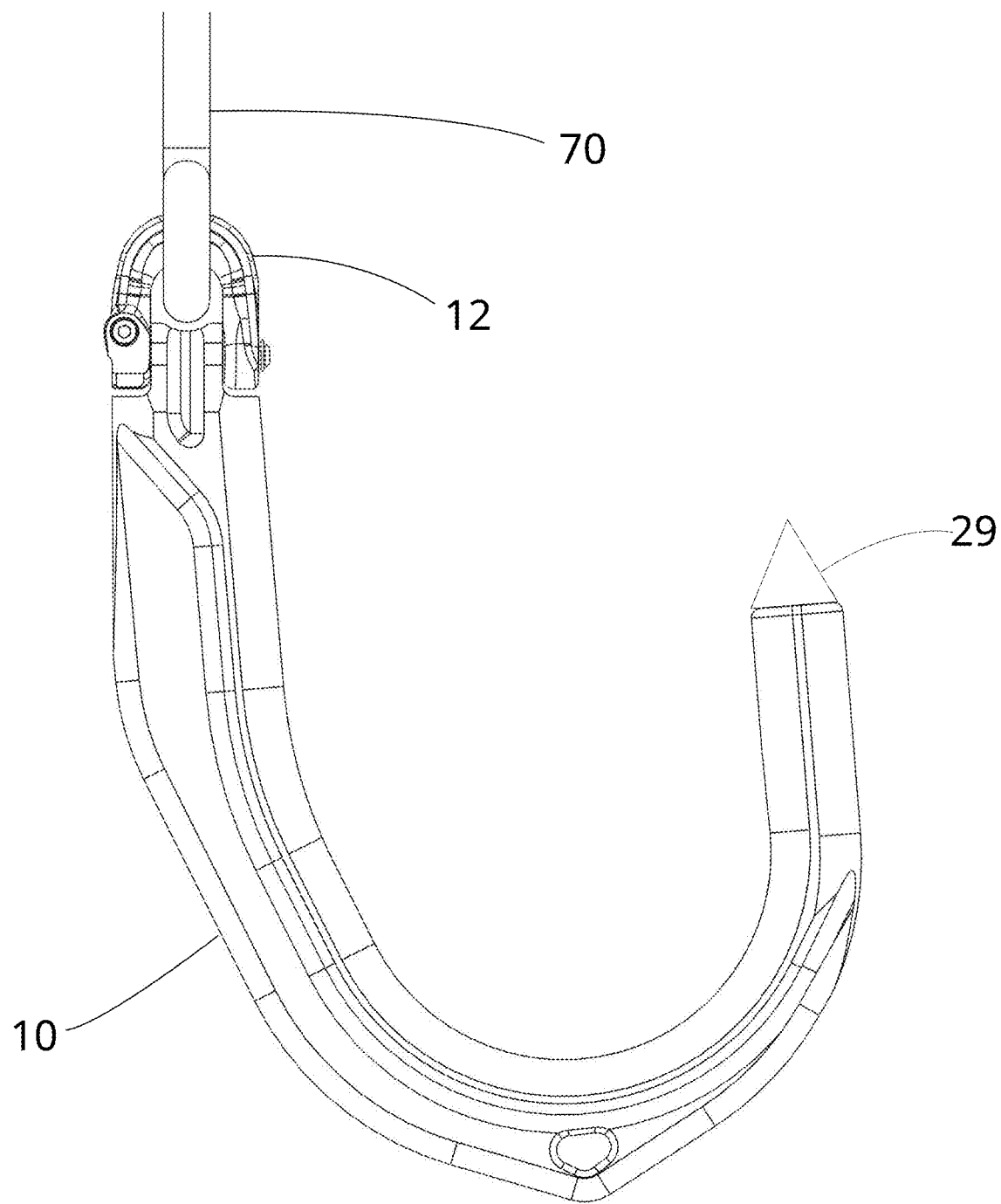

For use, a rope line 70 is attached to the shackle 12, as shown in FIGS. 5 and 6.

To deploy the hook, a user throws it to pass over and beyond a branch 72 (shown approximately in dotted lines in FIG. 5), such that the hook carries the rope line 70 over the branch 72 and drops behind it (from the point of view of the user). The presence of the weight of the bolt 28 helps to enable the hook to draw the rope line and enhances the ability of the thrown hook to penetrate a tree cavity. The user then draws in the rope line, thereby pulling the hook towards the branch 72, the aim being that the branch 72 enter the bight such that the hook serves to anchor the rope line 70 to the branch 72. Contact between the body 10 and the branch 72 occurs at the flat inner surface, which minimizes contact pressure and therefore minimizes the risk that the branch will be damaged. The bolt 28 can be replaced by a functional component such as a point 29, as shown in FIG. 6.

It may be that the hook is drawn directly into the position described above. However, it will often happen that the hook is initially not correctly aligned with the branch and that it will have to re-orientate before it can hook on securely. Several features of this embodiment serve to assist achieve this aim:

the bolt 28 acts as a weight that helps draw the free end portion 10 downwards such that the free end portion 10 can pass below the branch, as required;

should the hook land on its side on the branch, the free pivot of the shackle 12 allows the body 10 to fall downward over the branch, thereby decoupling it from any stiffness in the rope;

if the outer part of the body should land on the branch, the relatively small cross-section of the rib 34 means that it will not balance that way, but instead fall with the free end portion downwards;

the first part of the body 10 to be drawn onto the branch 72 will typically be in the region of the fulcrum surface 36; if the hook then falls under the weight of the bolt 28, then the relative positions of the end surface of the body 10 and the fulcrum surface 36 ensures that the free end region 20 passes behind (from the point of view of the user) the branch 72.

When the throwing hook is being carried prior to or following use, it can be secured to an arborist's harness, belt or otherwise by a lanyard passed through the aperture 42. This allows an arborist to climb with minimal risk that the hook will accidentally get caught on a branch.

As has been discussed, embodiments of the invention described above are configured such that they will tend to readily hook onto a branch or other anchor. In some cases, this can make it difficult for a user to release the hook so that it can be retrieved after use. The user can use the attachment rope to manipulate the hook to angle it to remove it from the anchor, which although is functional does leave some aspects of the release up to chance and user skill. Also once released, due to the shape of the hook it still tends to hook anchors so subsequently gets hooked to unwanted anchors when being retrieved to the user. Therefore, embodiments of the invention may include a release mechanism.

The release mechanism has three desirable properties: it provides the ability to release the hook from an anchor from a remote position; it keeps the hook in an orientation that is less susceptible to being entangled or re-hooked when being withdrawn through the climbing environment; and it is resettable to the normal anchoring orientation remotely if required.

A second embodiment includes a release mechanism and is shown in FIGS. 9 to 12. This embodiment is substantially the same as that of the embodiment described with reference to FIGS. 1 to 8, with modifications, as will be described.

The principle modification to the body is that a groove 180 is formed in the rib 134, the groove being open away from the centre C, from adjacent to the aperture 142 to close to the connection with the shackle 112. A release cord 182 is connected to the body at a location adjacent to the aperture 142 and extends within the groove 180 towards the shackle 112. The release cord 182 then extends from the body 110 and is threaded through a portion of the rope line 170 and then extends for substantially the length of the rope line 170.

Figure 9:
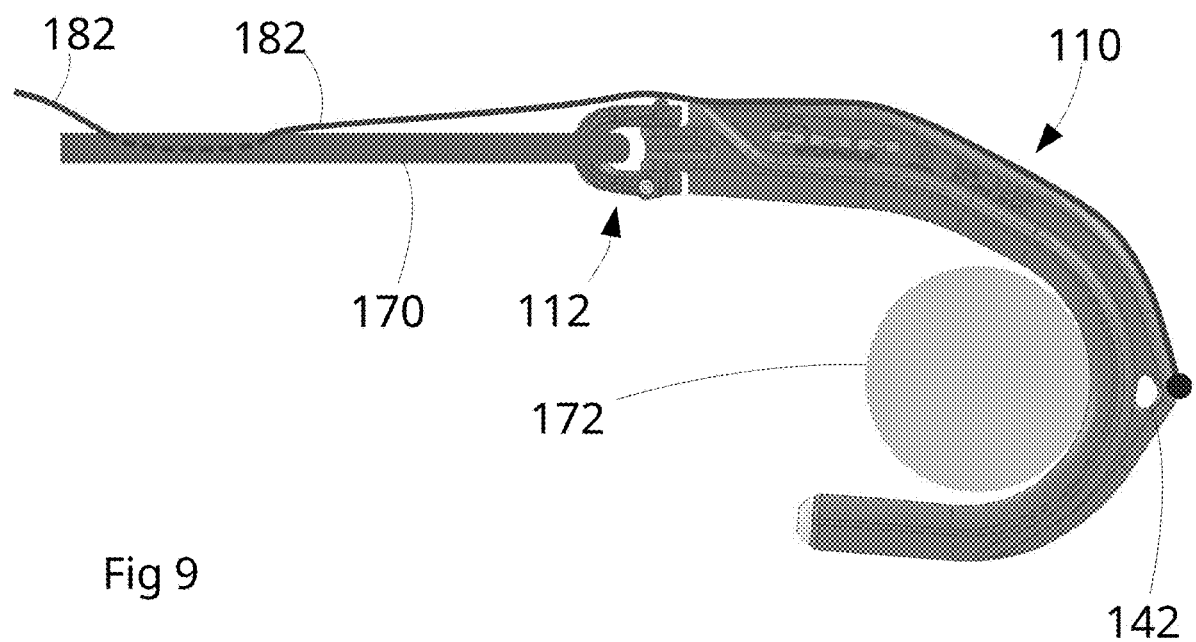
FIG. 9 shows a second embodiment of the invention, which incorporates a release mechanism in place on an anchor.
Figure 10:
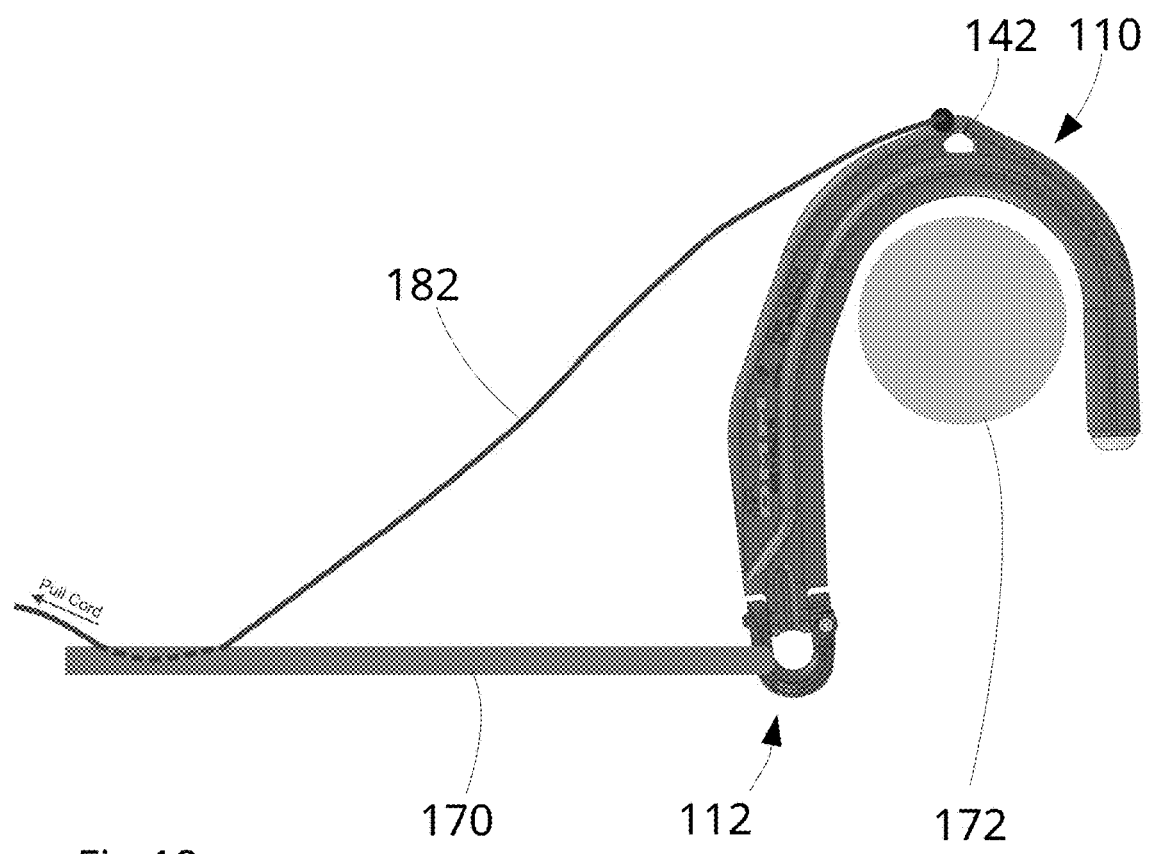
FIGS. 10 and 11 show the embodiment of FIG. 9 in an intermediate and a release configuration.
Figure 11:
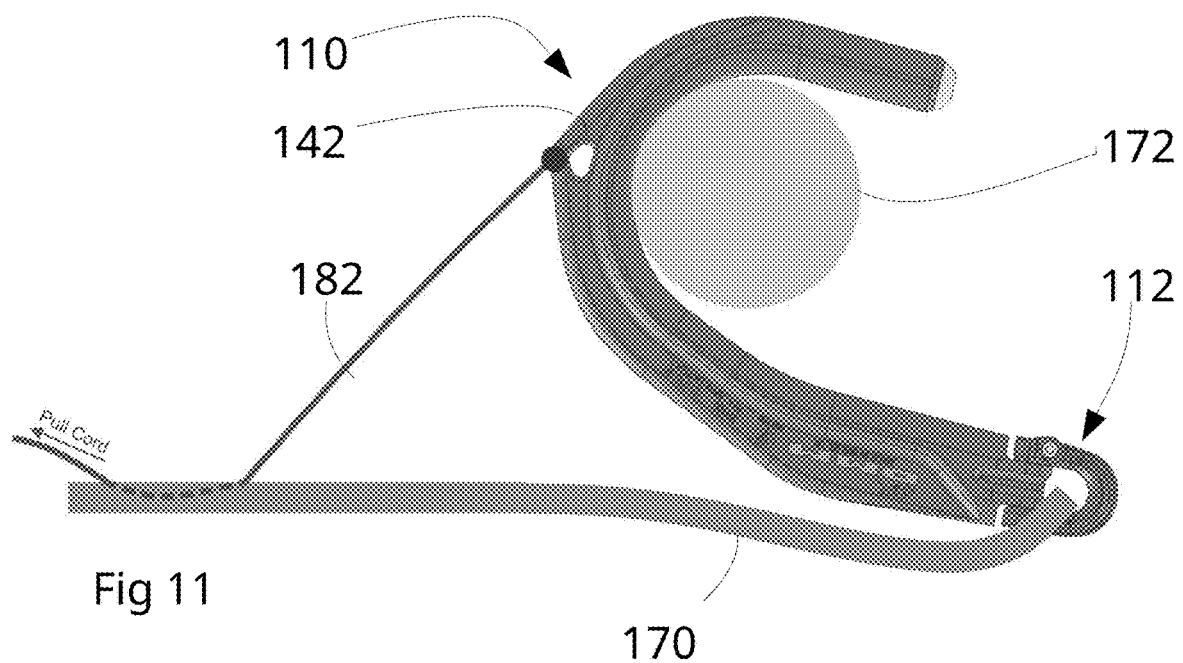

Prior to deployment of the hook, a sufficient length of the release cord 182 is drawn from the rope line 170 to allow the rope line 170 to extend from the shackle 112 in a direction that is approximately parallel to and away from the region of the hook 110 that is adjacent to the shackle 112. The hook can then be thrown and hooked on to a branch 172 or other anchor in the same manner as the first embodiment. The deployed hook is shown in FIG. 9. To release the hook, the user pulls the release cord 182, which causes the body 110 to pivot about the shackle 112 past the position shown in FIG. 10 to that shown in FIG. 11, in which the rope line 170 lies adjacent to the region of the hook 110 that is adjacent to the shackle 112. Pulling on the rope line 170 now causes the body 110 to pull away from the branch 172 such that it can be retrieved by the user.

Figure 12:
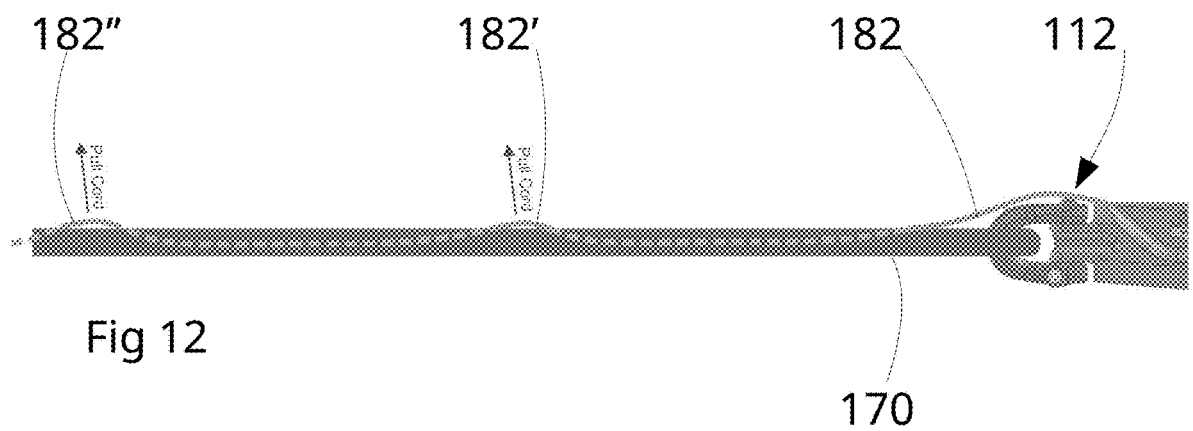
FIG. 12 is a view of a rope line for use with the embodiment of FIGS. 9 to 11.
Figure 13:
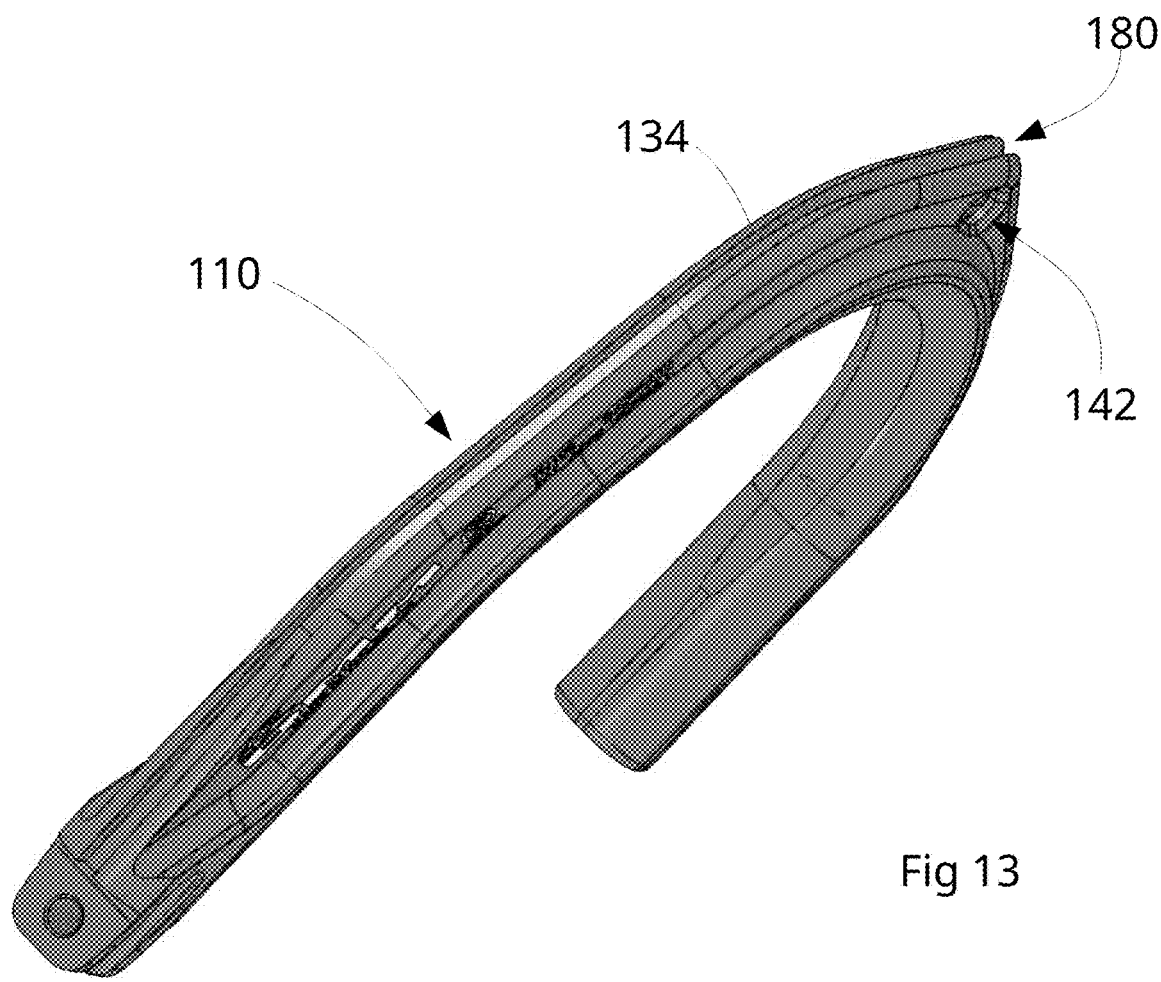
FIG. 13 shows the body of the embodiment of FIG. 9.
Figure 14:
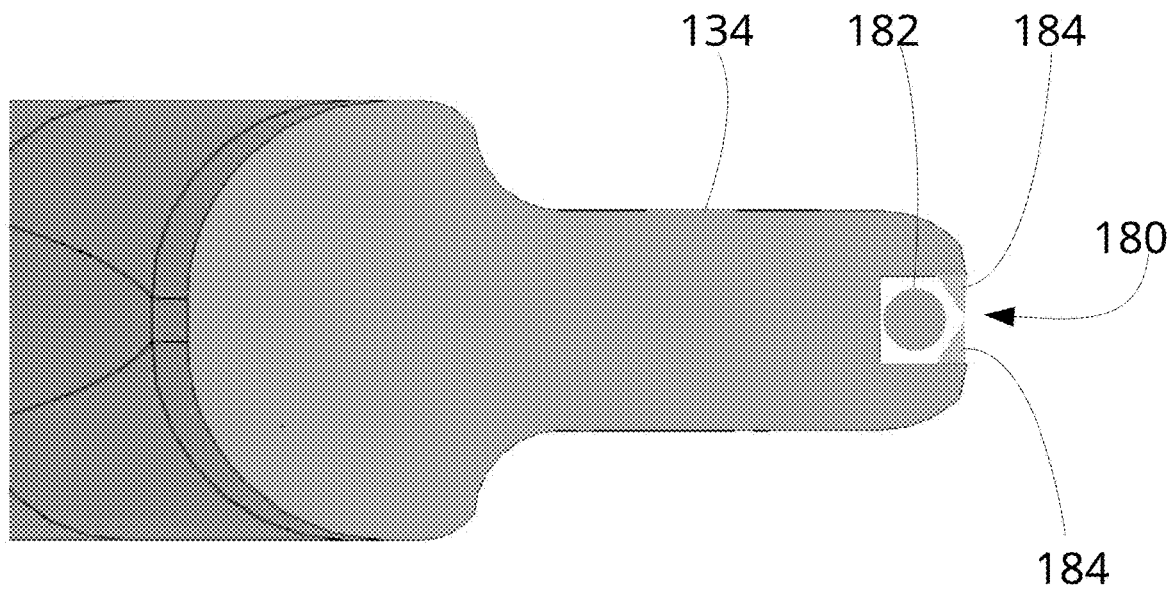
FIG. 14 is a cross-section through the body of FIG. 13.

As shown in FIG. 12, the release cord 182 may be within the rope line 170 for most of its length, with loops 182', 182" of the release cord emerging from it at intervals. The release cord 182 can be pulled at any of these loops to effect release of the hook. This arrangement reduces the risk of the release cord 182 becoming caught or tangled than would be the case if it were free for most of its length.

In order to retain the release cord 182 within the groove 180 while the hook is being deployed and used, a flexible fin 184 may be provided on each of the walls of the groove 180, close to the opening of the groove 180, and arranged such that they project towards one another. The release cord 182 can be pushed past the fins 184 into the groove, where it will be retained by the fins 184. When a user pulls on the release cord 182, it will easily deflect the fins 184 so that it can be pulled from the groove 180 to effect release of the hook, as described above.

Figure 15:
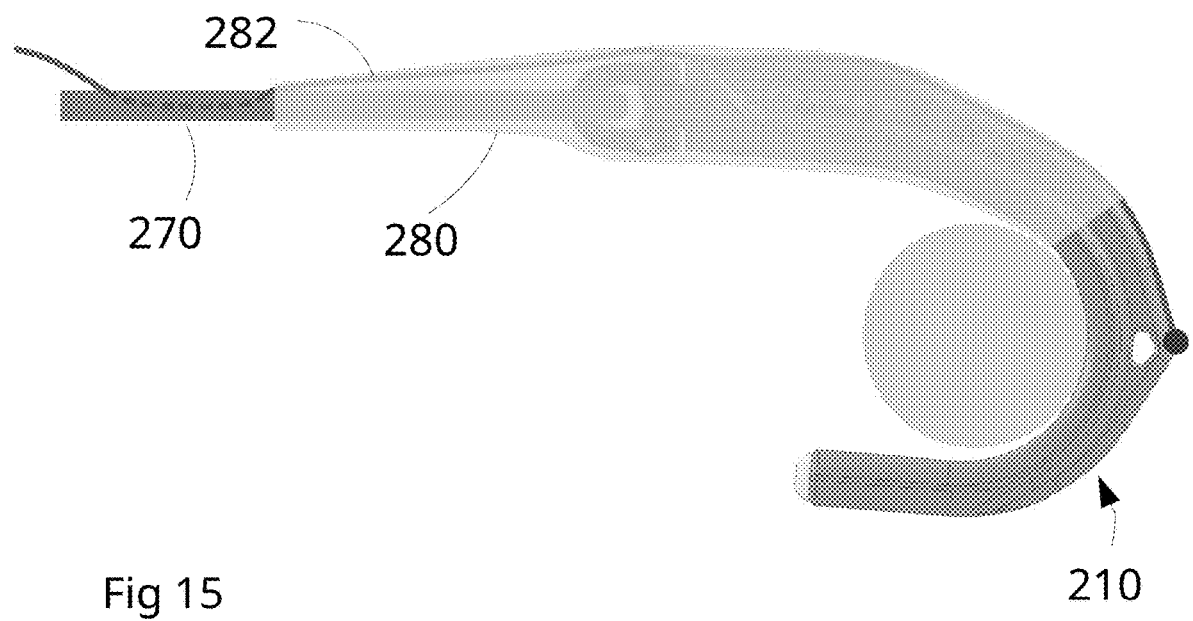
FIGS. 15 and 16 show a modification of the embodiment of FIG. 9.
Figure 16:
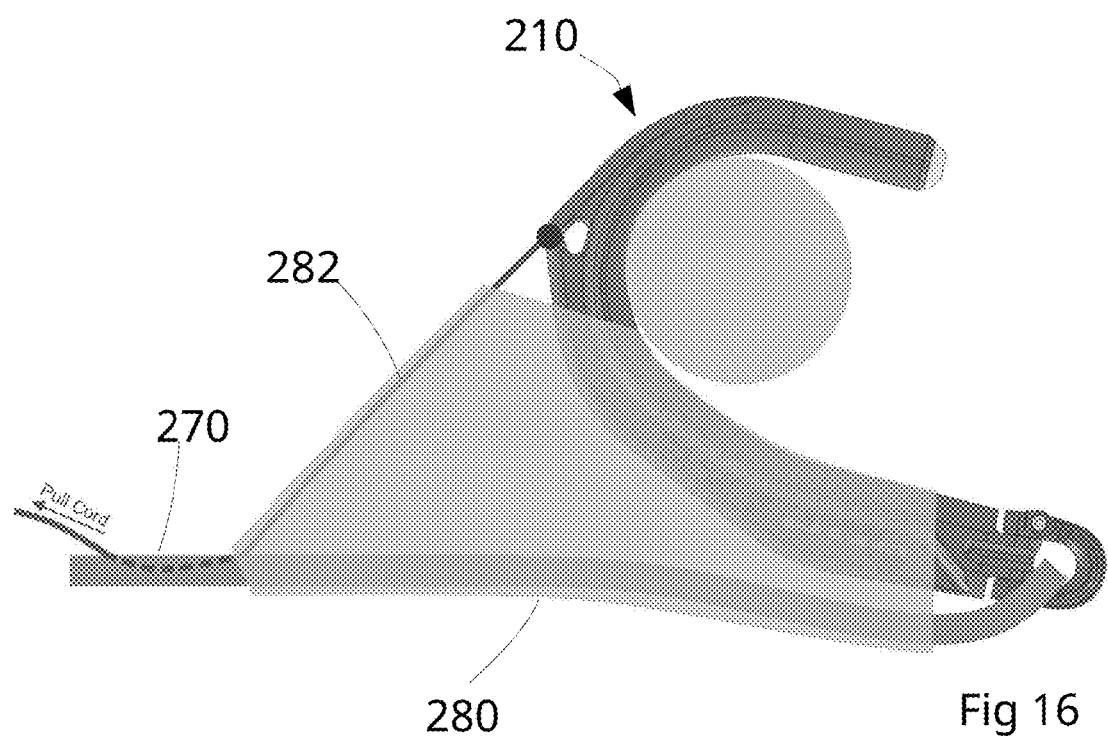

In the embodiment of FIGS. 15 and 16, the body 210 is identical to that of the first embodiment of the invention—that is, there is no groove in the body. A sleeve 280 of elastomeric material surrounds part of the body 210 and part of the rope line 270, extending from close to the point of connection between the release cord 282 with the body to close to where the release cord 282 enters the rope line 270. This arrangement can be retro-fitted to a first embodiment of the invention.

In normal use, the sleeve 280 holds the release cord 282 closely against the body 210 where is will not become tangled or snagged. When the release cord 282 is pulled, the sleeve 280 stretches, allowing the release cord 282 to separate thereby allowing the body 210 to pivot to the position shown in FIG. 16, in which it can be retrieved from the anchorage.

Figure 17:
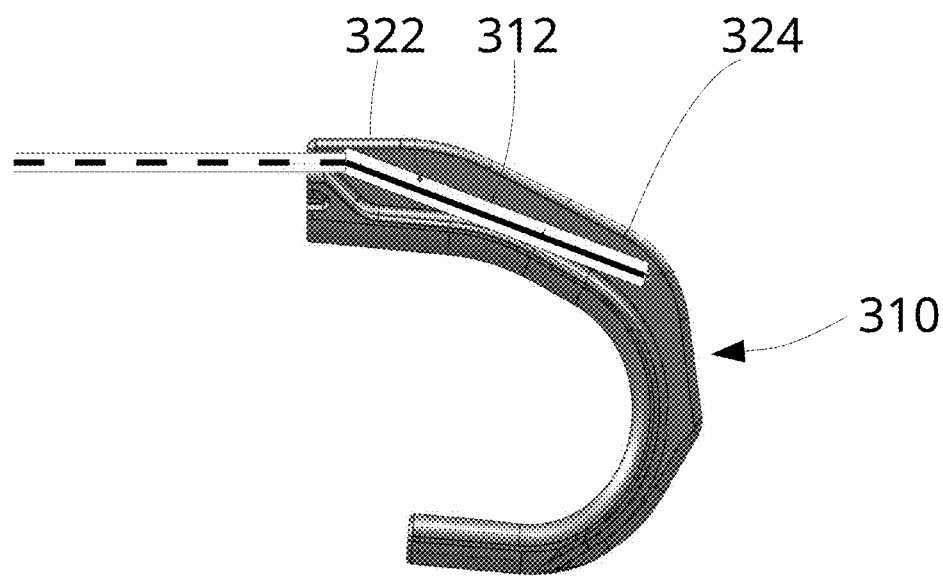
FIGS. 17 to 19 show a third embodiment of the invention.
Figure 18:
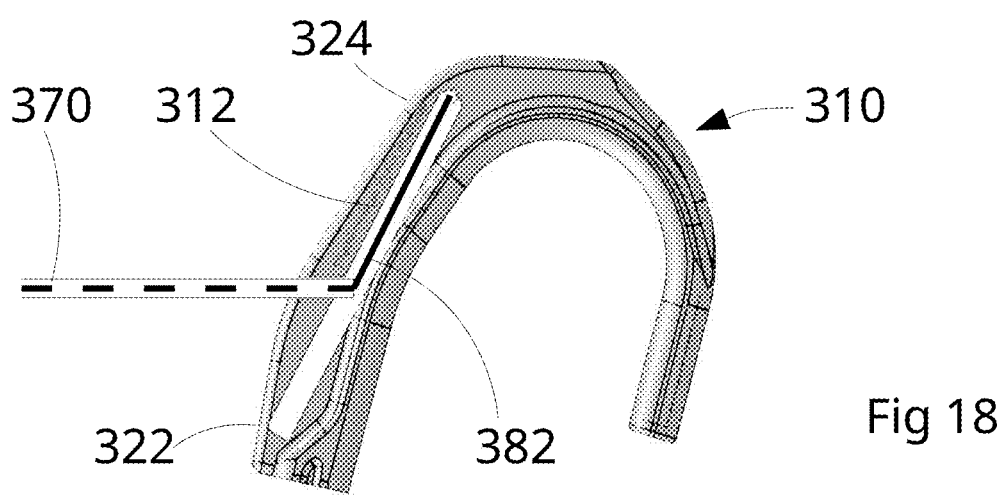
Figure 19:
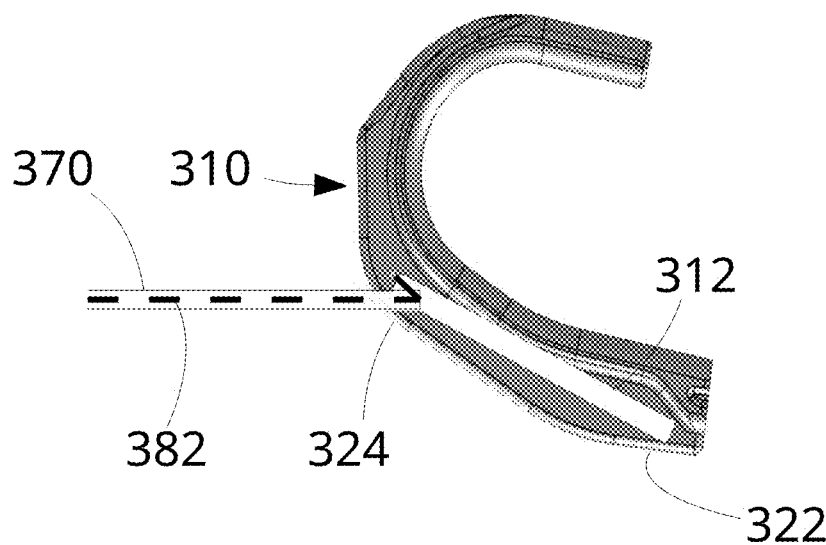

With reference now to FIGS. 17 to 19, a third embodiment of the invention has a body 310 that, as compared with that of the first embodiment, is formed with an elongate slot 312 extending through it from the end region 322 towards the intermediate region 324. An end part of the rope line 370 is retained in the slot 312 such that it can slide along the slot 312. The release cord 382 extends through the rope line 370 to emerge from it within the slot 312, and from there, extend to an anchorage point at the end of the slot nearest the intermediate region 324.

In normal use, the rope line 370 is at the end of the slot nearest the end region 322, which allows the hook to be used in much the same way as the first embodiment. To release the hook from an anchorage, the release cord 382 is pulled, which has the effect of pulling the end of the rope line 370 along the slot 312 towards the intermediate region 324, as shown in FIGS. 18 and 19. This causes the body 310 to pivot to the orientation shown in FIG. 19, in which it can be released form the anchorage.

The second and third embodiments work by moving the point of or the direction of pull effected by the rope line on the hook body by pivoting the hook around a fulcrum to pivot it back on itself to release it and create a more suitable shape for retrieval. The fourth embodiment instead moves the area of contact between the hook body and the anchorage relative to the direction of pull.

Figure 20:
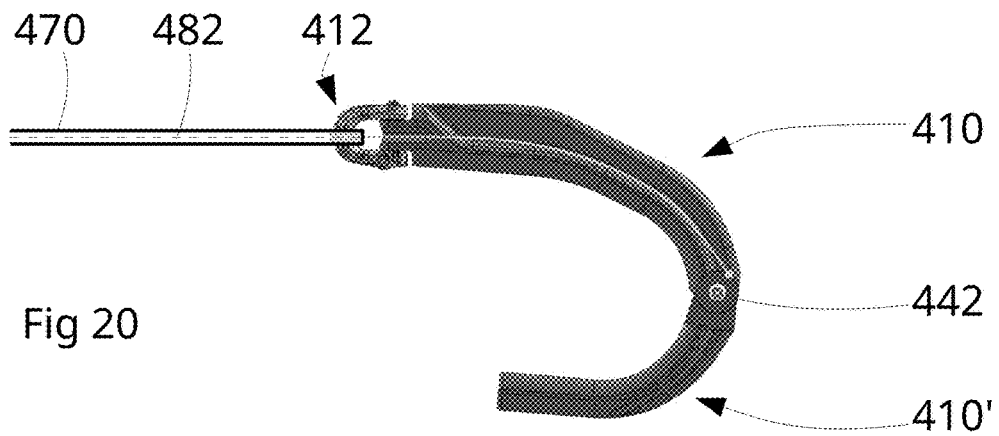
FIGS. 20 to 22 show a fourth embodiment of the invention.
Figure 21:
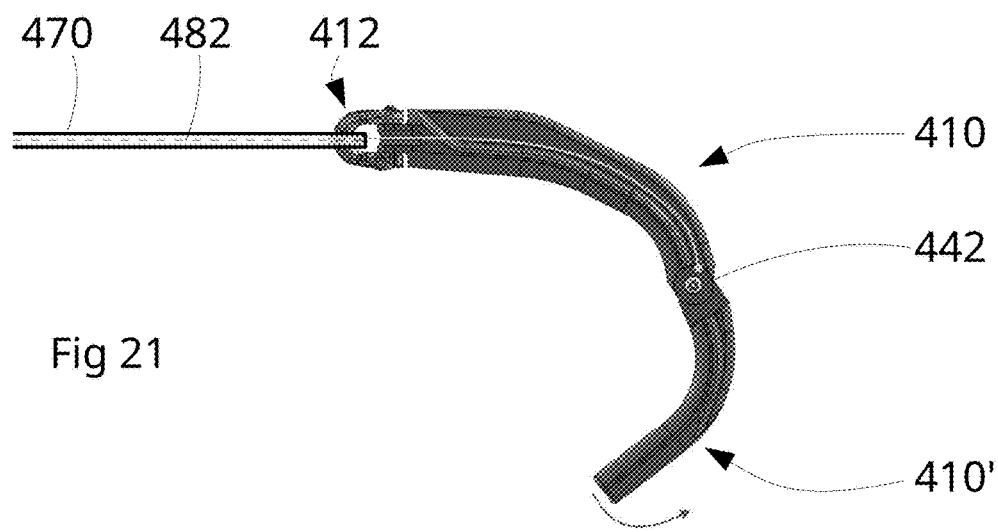
Figure 22:
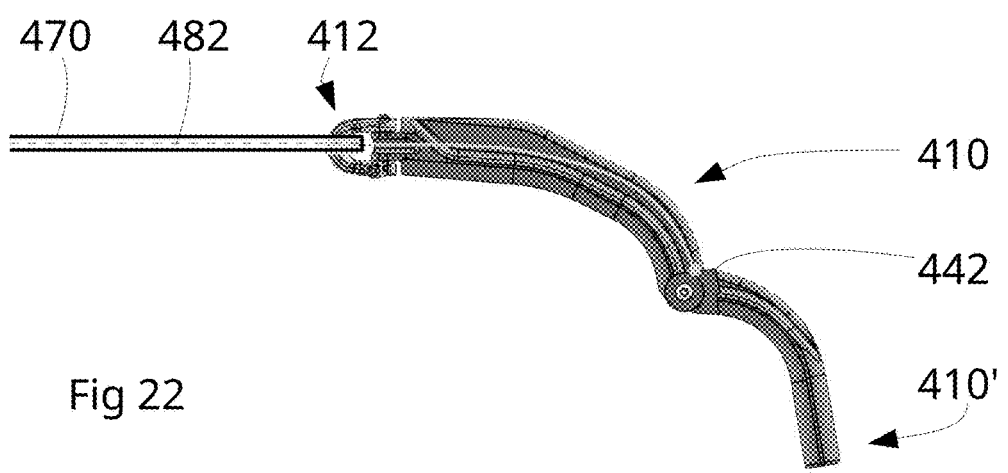

With reference to FIGS. 20 to 22, in the third embodiment of the invention, the rope line 470 is secured to the body 410 by a shackle 412, as in the first embodiment. The body is constructed from first and second parts 410, 410' interconnected by a lockable hinge 442 instead of the attachment region 40 of the first embodiment. The release cord 482 emerges from the rope line 470 adjacent to the shackle 412 and extends though the first part of the body 410 to the hinge 442.

In normal use, the hinge 442 is locked in a position such that the overall shape of the body as defined by the first and second parts 410, 410' is substantially the same as that of the first embodiment, and the hook can be used in a similar manner. If the release cord 482 is pulled, it acts to release the hinge 442 which allows the second part 410' to pivot with respect to the first part 410, effectively straightening the profile of the body, until the configuration of FIG. 22 is achieved. The hinge 442 may also lock in this position. In this configuration, the body no longer is effective in attaching to an anchor, which allows the hook to be retrieved.

Figure 23:
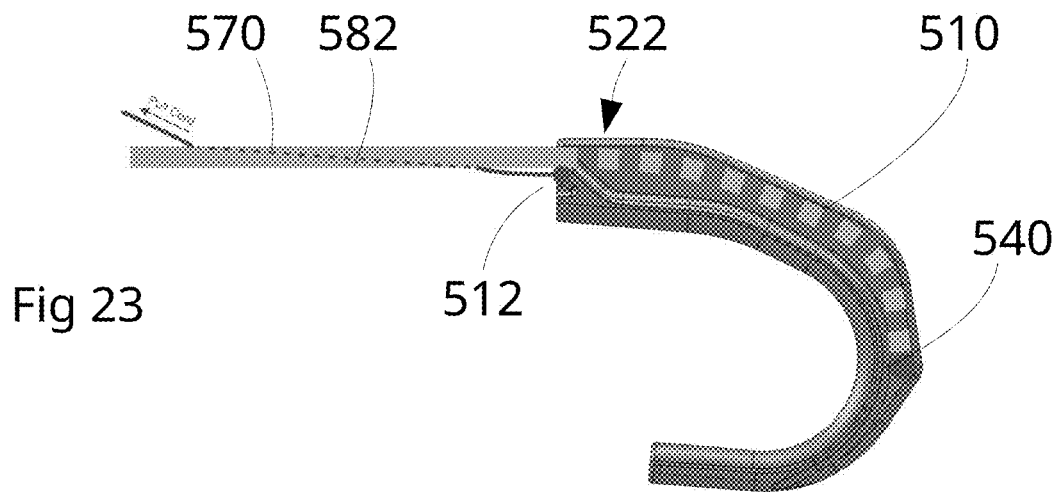
FIGS. 23 to 25 show a fifth embodiment of the invention.
Figure 24:
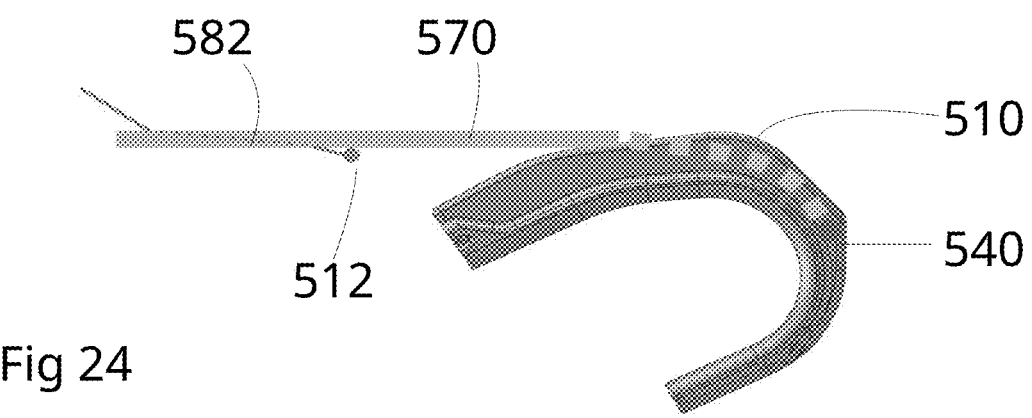

In the fourth embodiment, the rope line 570 is attached to the body 510 at the attachment region 540, and wraps around the periphery of the body to the end region 522. The rope line 570 is secured to the body 510 close to the end region 522 by a releasable connector, as shown in FIG. 23. In this configuration, the hook can be used and connected with an anchor.

Figure 25:
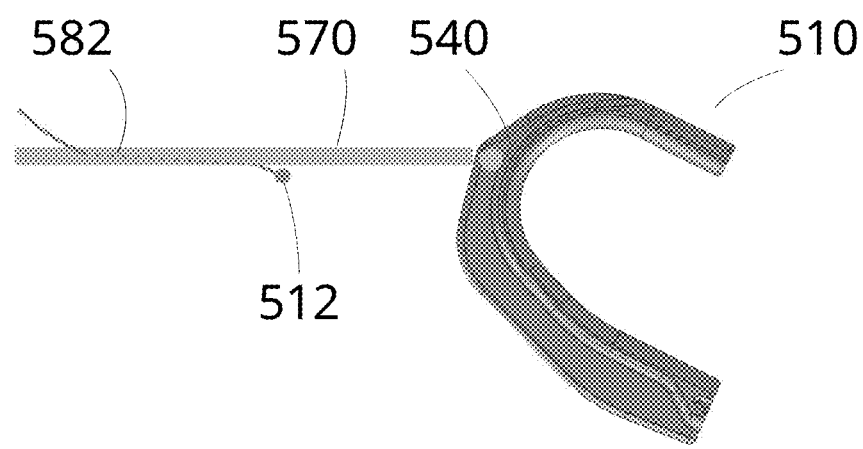

The connector is configured such that if a user pulls on the release cord 582, it releases its connection, thereby allowing the rope line 570 to unwrap from the periphery of the body 510 until it is connected only at the attachment region 540, as shown in FIG. 25. In this configuration, the hook can be retrieved by pulling on the rope line 570.

What is claimed is:

1. A throwing hook that secures to an anchorage when thrown by a user, the throwing hook comprising:
   a body extending along a plane, the body including i) a free end region extending along the plane and along a first axis, ii) an attachment region extending along the plane and along a second axis, the attachment region terminating with a boss having a bore that extends along the plane, iii) a weight provided on the free end region, and iv) a bight comprised of a curved portion that extends along the plane between and connecting the free end region and the attachment region,
   wherein the first axis of the free end region and the second axis of the attachment region are parallel to one another; and
   a shackle that comprises a loop through which a rope line can be secured to extend in alignment with the attachment region, the shackle having a first free end region and second free end region, the shackle being secured to the boss by a pin that passes through the first and second free end regions of the shackle and through the bore of the boss to pivotable mount the shackle to the attachment region of the body such that the shackle and the body can pivot freely with respect to one another about an axis that extends along the plane, the shackle being positionable to extend along the plane from the first free end region of the shackle to the second free end region of the shackle,
   wherein the curved portion of the bight turns through 180 degrees with a first end of the curved portion connecting to the free end region extending along the first axis and an opposite, second end of the curved portion connecting with the attachment region extending along the second axis, the curved portion presenting a convex outer profile and a concave inner profile, and the throwing hook being open between the free end along the first axis and the attachment region along the second axis, the convex outer profile includes an externally protruding rib, the rib extending along the convex outer profile from the attachment region to the first end region and presenting a convex outer surface.

2. The throwing hook of claim 1, wherein the free end region and the attachment region extend parallel to one another.

3. The throwing hook of claim 1, wherein the rib, towards the attachment region, is of decreasing height and includes a fulcrum surface of straight profile.

4. The throwing hook of claim 1, wherein the weight is constituted by a bolt in threaded engagement with a tapped bore in the free end region.

5. The throwing hook of claim 1, further comprising:
   a functional component secured to the free end region.

6. The throwing hook of claim 5, wherein the functional component includes a point that engages with a surface to secure the hook on a surface.

7. The throwing hook of claim 1, wherein the body has an inner surface that is generally flat in a transverse direction.

8. The throwing hook of claim 1, wherein an aperture is formed through the rib approximately centrally of the bight of the body.

9. The throwing hook of claim 1, further comprising:
   a release mechanism operable by a user to facilitate release of the hook from an anchorage.

10. The throwing hook of claim 9, further comprising:
    a concave inner and convex outer surface,
    wherein operation of the release mechanism causes the hook to turn such that the convex outer surface faces more towards a release cord connected to the shackle than when the hook is on an anchorage.

11. A throwing hook that secures to an anchorage when thrown by a user, the throwing hook comprising:
    a body extending along a plane, the body including i) a free end region extending along the plane and along a first axis, ii) an attachment region extending along the plane and along a second axis, the attachment region terminating with a boss having a bore that extends along the plane, iii) a weight provided on the free end region and extending along the second axis, and iv) a bight comprised of a curved portion that extends along the plane between and connecting the free end region and the attachment region, the throwing hook being open between the free end along the first axis and the attachment region along the second axis;
    a shackle that comprises a loop through which a rope line can be secured to extend in alignment with the attachment region,
    the shackle having a first free end region and second free end region; and
    a pin that secures the shackle to the boss, the pin passing through the first and second free end regions of the shackle and through the bore of the boss to pivotable mount the shackle to the attachment region of the body such that the shackle and the attachment region of the body can pivot freely with respect to one another about an axis that extends along the plane,
    the shackle being positionable to extend along the plane from the first free end region of the shackle to the second free end region of the shackle,
    wherein the curved portion of the bight turns through a circular arc and connects i) to the free end region extending along the first axis and ii) to the attachment region extending along the second axis,
    wherein the curved portion presents a convex outer profile and a concave inner profile,
    wherein the curved portion further includes an externally protruding rib that includes a first portion that provides a fulcrum surface of straight profile connected to a second portion that extends along the convex outer profile and presents a convex outer surface.

12. The throwing hook of claim 11, wherein the free end region and the attachment region extend parallel to one another.

13. The throwing hook of claim 11, wherein an aperture is formed through the rib approximately centrally of the bight of the body.

14. The throwing hook of claim 11, further comprising a release mechanism operable by a user to facilitate release of the hook from an anchorage.

\* \* \* \* \*